June 17, 1958 — M. L. ROUTH — 2,839,028
LIVESTOCK FEEDER OR WATERER
Filed March 10, 1955
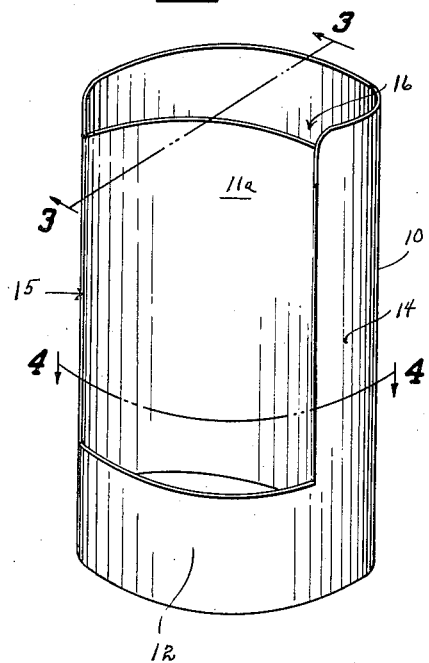
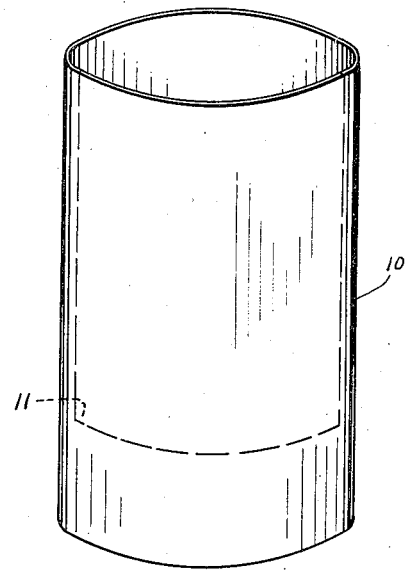
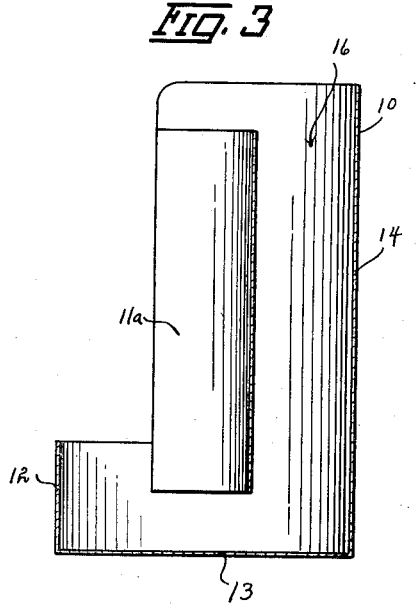
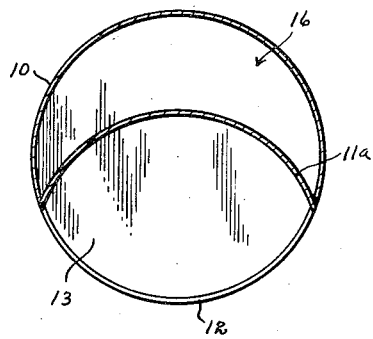
INVENTOR.
MARION LEE ROUTH
BY
Talbert Dick & Adler
ATTORNEYS.

018
United States Patent Office 2,839,028
Patented June 17, 1958

2,839,028

LIVESTOCK FEEDER OR WATERER

Marion Lee Routh, Diagonal, Iowa

Application March 10, 1955, Serial No. 493,361

1 Claim. (Cl. 119—52)

This invention relates to a service container for watering and/or feeding livestock such as hogs, sheep, cows, horses, and fowls, and more particularly to a method of making such a container from an open top pail, can, drum or like.

There are many types of feeders and water devices in use. They, however, are usually not of the self-supply feeder category and are relatively costly.

Therefore, one of the principal objects of my invention is to provide a self-supplying feeder and waterer that is simple and of no working or moving parts.

A further object of this invention is a method of converting an ordinary, easy available open top container into an efficient feeder or waterer.

Still further objects of my invention are to provide an animal or fowl service container that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claim, and illustrated in the accompanying drawings, in which:

Fig. 1 is a perspective view of my completed unit ready for use,

Fig. 2 is a perspective view of an ordinary open top container with broken lines showing where it is cut to form my stock service container, Fig. 3 is a vertical cross sectional view of my unit taken on line 3—3 of Fig. 1, and Fig. 4 is a horizontal cross sectional view of my feeder or waterer taken on line 4—4 of Fig. 1.

In these drawings I have used the numeral 10 to designate any suitable open top container such as a metal barrel or like. Out of the side wall of this container I cut a rectangular section which I designate as 11 and as shown in Fig. 2. Assuming that the container is of the cylinder type, the section 11 cut therefrom will be convex. The portion 11 extends to the top of the container 10, but has a height less than the height of the container so that a rim wall 12 of the container will remain after the section 11 is removed. This rim wall 12 is, obviously, at the bottom area of the container as shown in Fig. 1. At this stage of manufacture (after the section 11 has been removed) the container will comprise a bottom 13, the high circular side wall 14, the low front side wall 12, and the front cut out opening 15 directly above the low front side wall 12. To complete the feeder and waterer, the cut out portion 11 is turned around, i. e., into a concave position and placed within the high wall portion 14, where it is welded, soldered, or riveted into place, as shown in Fig. 1 and given the numeral 11a. Its lower edge is positioned below the horizontal plane top of the front short wall 12 as shown in Fig. 3. By this arrangement there will be an area 16 between the portion 11a and the high wall portion 14 for receiving a supply of food or liquid, as shown in Fig. 4.

The water, liquid or food is poured into this space 16, where it will pass downwardly into the bottom area of the container and thence flow under the portion 11a into the forward inside bottom of the container. In the case of feed, as the animals or fowls consume the food forward of the part 11a, the feed in the area 16 will automatically feed downwardly and forwardly to automatically maintain a food level in the front open bottom portion of the feeder. The feed will not accumulate above and run over the short wall 12 because the rim top of the short wall 12 is in a horizontal plane above the plane of the horizontal bottom of the portion 11. This self-service action will continue automatically until all the supply feed has passed from the area 16. A considerable area for feeding or drinking will be provided within the container due to the short wall 12 bowing outwardly and the wall 11a bowing inwardly.

Besides the high wall portion 14 and portion 11a producing a supply bin, these upwardly extending portions serve as a safety guard to the user from the animals. Especially in the case of hogs, which are not only rough in reaching food but muddy or dirty, the user in pouring water or food into the storage portion 16 may stand safely back of the portion 14. After the device is assembled the upper corners of the wall 14 may be rounded or blunted as shown in Fig. 1.

The device has no mechanical parts and after formed is to all intent and purpose a one-piece unit.

By reversing the part 11, and fastening it into place, a very rigid container is formed.

The space 16 is made possible by the width of the part 11 being less than one half of the circumference of the container.

Some changes may be made in the construction and arrangement of my livestock feeder or waterer without departing from the real spirit and purpose of my invention, and it is my intention to cover by my claim, any modified forms of structure or use of mechanical equivalents which may be reasonably included within its scope.

I claim:

In a livestock feeder or waterer, a circular walled container having an open top and a bottom; said container having a rectangular opening in its circular wall located a substantial distance above its bottom to provide a circular ledge directly below the said opening; said opening having a width less than one-half of the circumference of said container, and a concave rectangular part inside the circular wall of said container having dimensions substantially that of the dimensions of said opening, back of said opening and extending downwardly to a horizontal plane below the horizontal plane of the said opening.

References Cited in the file of this patent

UNITED STATES PATENTS

| | | |
|---|---|---|
| 1,102,629 | Anderson et al. | July 7, 1914 |
| 1,433,477 | Ritchie | Oct. 24, 1922 |
| 1,503,705 | Parker | Aug. 5, 1924 |
| 1,607,155 | Felker | Nov. 16, 1926 |
| 2,527,975 | Turner | Oct. 31, 1950 |
| 2,529,627 | Oldfield | Nov. 14, 1950 |
| 2,535,838 | Coyle | Dec. 26, 1950 |
| 2,711,147 | Johnson | June 21, 1955 |